(12) United States Patent
Ruohio et al.

(10) Patent No.: US 7,555,950 B2
(45) Date of Patent: Jul. 7, 2009

(54) CAPACITIVE SENSOR AND A METHOD FOR MANUFACTURING THE CAPACITIVE SENSOR

(75) Inventors: Jaakko Ruohio, Helsinki (FI); Risto Mutikainen, Espoo (FI)

(73) Assignee: VTI Technologies Oy, Vantaa (FI)

( * ) Notice: Subject to any disclaimer, the term of this patent is extended or adjusted under 35 U.S.C. 154(b) by 179 days.

(21) Appl. No.: 11/232,922

(22) Filed: Sep. 23, 2005

(65) Prior Publication Data

US 2006/0213269 A1 Sep. 28, 2006

(30) Foreign Application Priority Data

Sep. 23, 2004 (FI) .................................. 20041229

(51) Int. Cl.
*G01P 15/125* (2006.01)
(52) U.S. Cl. .................................. 73/514.32
(58) Field of Classification Search ............. 73/514.32, 73/514.01, 718, 724
See application file for complete search history.

(56) References Cited

U.S. PATENT DOCUMENTS

| | | | | |
|---|---|---|---|---|
| 3,222,581 | A | | 12/1965 | Lenfant |
| 4,422,243 | A | * | 12/1983 | Brunson et al. ............... 33/369 |
| 4,829,826 | A | | 5/1989 | Valentin et al. |
| 5,180,986 | A | * | 1/1993 | Swartz et al. ............... 324/660 |
| 5,381,299 | A | * | 1/1995 | Provenzano et al. ..... 361/283.4 |
| 5,442,962 | A | | 8/1995 | Lee |
| 5,567,878 | A | * | 10/1996 | Kobayashi ............... 73/514.12 |
| 5,646,349 | A | * | 7/1997 | Twigg et al. ............. 73/514.38 |
| 5,864,064 | A | * | 1/1999 | Kano et al. ............... 73/514.36 |
| 6,005,275 | A | * | 12/1999 | Shinogi et al. ............... 257/417 |
| 6,082,197 | A | * | 7/2000 | Mizuno et al. ........... 73/514.36 |
| 6,151,967 | A | * | 11/2000 | McIntosh et al. ......... 73/514.32 |
| 6,225,668 | B1 | * | 5/2001 | Shindo et al. ............... 257/368 |
| 6,267,009 | B1 | * | 7/2001 | Drewes et al. ................ 73/718 |
| 6,388,299 | B1 | | 5/2002 | Kang et al. |
| 6,456,477 | B1 | * | 9/2002 | McIntosh et al. ............. 361/115 |
| 2001/0020320 | A1 | * | 9/2001 | McIntosh et al. ........... 29/25.41 |
| 2001/0047689 | A1 | * | 12/2001 | McIntosh .................. 73/514.32 |
| 2002/0033048 | A1 | | 3/2002 | McIntosh et al. |

(Continued)

FOREIGN PATENT DOCUMENTS

EP 0 385 574 9/1990

(Continued)

OTHER PUBLICATIONS

W. Qu, C. Wenzel and K Drescher "Fabrication of low-cost capacitive accelerometers by 3D Microforming" Dec. 11, 1996 Optoelectronic and Microelectronic Materials and Devices Proceedings, 1996 Conference; on pp. 462-645.*

*Primary Examiner*—Hezron Williams
*Assistant Examiner*—Gunnar J Gissel
(74) *Attorney, Agent, or Firm*—Squire, Sanders & Dempsey L.L.P.

(57) ABSTRACT

The present invention relates to measuring devices for use in physical measuring, and in particular to capacitive sensors. In the sensor according to the invention, the shape of the stationary electrode (3), (4), (12), (17-20), (27-28) is stepped. Through the invention, a method for manufacturing a capacitive sensor with improved linearity is achieved, as well as a capacitive sensor suitable for use particularly in small capacitive sensor solutions.

47 Claims, 5 Drawing Sheets

U.S. PATENT DOCUMENTS

| | | | |
|---|---|---|---|
| 2002/0068370 A1* | 6/2002 | Dwyer | 438/14 |
| 2002/0093721 A1* | 7/2002 | Knipe | 359/291 |
| 2002/0124656 A1* | 9/2002 | McIntosh | 73/753 |
| 2003/0036214 A1* | 2/2003 | Eskridge | 438/48 |
| 2004/0070813 A1* | 4/2004 | Aubuchon | 359/290 |
| 2004/0070815 A1* | 4/2004 | Aubuchon | 359/291 |
| 2004/0165249 A1* | 8/2004 | Aubuchon | 359/291 |

FOREIGN PATENT DOCUMENTS

| | | |
|---|---|---|
| JP | 9-43083 | 2/1997 |
| JP | 9-257617 | 10/1997 |
| WO | WO 02/50874 A2 | 6/2002 |
| WO | WO 2004/072655 A1 | 8/2004 |

* cited by examiner

CAPACITIVE SENSOR AND A METHOD FOR MANUFACTURING THE CAPACITIVE SENSOR

FIELD OF THE INVENTION

The invention relates to measuring devices used in physical measuring and more specifically to capacitive sensors. The object of the present invention is to provide a method of improved linearity for the manufacturing of a capacitive sensor, and a capacitive sensor applicable for use particularly in small capacitive sensor solutions.

BACKGROUND THE INVENTION

Measuring based on a capacitive sensor has proved to have a simple principle and to provide a reliable method in the measuring of physical quantities, like for instance acceleration, pressure or angular velocity. The capacitive measuring is based on a change in the gap between two surfaces of a pair of electrodes of the sensor. The capacitance between the surfaces, i.e. the capacity for storing electric charge, depends on the area of the surfaces and on the distance between the surfaces. Capacitive measuring can be used already at rather low measuring ranges of acceleration, pressure or angular velocity.

The basis for the structure of small capacitive sensors is a thin-film structure manufactured on silicon. The thin membrane forming one of the electrodes bends under influence of the quantity to be measured and thus changes the capacitance to be measured.

Frequently it is desirable that the output of the sensors is linearly dependent on the quantity to be measured.

The capacitance of a planar capacitor is determined by the equation:

$$C = \varepsilon_0 \frac{A}{d},$$

in which A is the area of the electrodes and d is the distance between them. Thus, the capacitance has an inverted linear proportionality to the distance d. The transfer function of a sensor, which, in addition to the planar capacitor, possesses a parallel stray capacitance $C_{00}$, in the case of a capacitive pressure sensor, for example, is determined as follows:

$$p = p_0 \left(1 - \frac{C_0}{C - C_{00}}\right),$$

where C is the measured capacitance, and $p_0$, $C_0$ and $C_{00}$ are constants by sensor. A sensor solution according to the transfer function like this can be cost-effectively implemented also by means of conventional and inexpensive analog electronics.

Further, for an acceleration sensor solution, for example, which consists of two coupled planar capacitors to be measured, this function of $\Delta x$ can be formulated $$V_{out}(\Delta x) = \frac{C_1 - C_2}{C_1 + C_2} = \frac{\varepsilon_0 \frac{A}{d - \Delta x} - \varepsilon_0 \frac{A}{d + \Delta x}}{\varepsilon_0 \frac{A}{d - \Delta x} + \varepsilon_0 \frac{A}{d + \Delta x}} = \frac{\Delta x}{d},$$

which, thus, is a linear function.

During the measuring event, in practice, the sensor's movable electrode, made of a thin foil, is being bent in a curved shape due to the quantity to be measured, for example. In the case of an acceleration sensor, the displacement of the seismic mass can be non-planar and, in addition to a pure translational motion, it can be partly or fully rotational. Thus, linearity error will be introduced in using the transfer functions mentioned the above, since the moving capacitor gap will not stay planar.

According to prior art, there are several solutions aiming at compensating for non-linearity introduced in capacitive sensors during the measuring process. In one solution the sensor's moving electrode, such as the foil in a pressure sensor, can be provided with a stiffener, whereby, at the location of the metal electrode, the foil moves as a plane, and the transfer function mentioned above can be used. Such a solution according to prior art is disclosed in, for example, U.S. Pat. No. 4,609,966.

One solution, according to prior art, for reducing non-linearity is making the sensor's moving electrode, such as, for example, the foil of a pressure sensor, non-uniform. This can, for example, be implemented in a known manner by adding support structures, such that the foil locally achieves maximal deflection at more than one point. By means of this solution, the capacitance dynamics of the measuring is achieved with less deflection, and, consequently, reduced non-linearity. Such a solution according to prior art is disclosed in, for example, U.S. Pat. No. 5,801,313 and U.S. Pat. No. 6,352,874.

Compensation of non-linearity introduced in capacitive sensors in the measuring process can also, according to prior art, be attempted by using a more complicated transfer function. This requires separate compensating electronics. Also, there is a disadvantage in that calibration will have to be performed at a larger number of points, should the model contain more independent parameters.

One solution for reducing non-linearity is using a touch-mode sensor according to prior art. Thereby, for a pressure sensor, for example, the pressure response will already be linear at its operational range and it will have a high sensitivity. Such a solution according to prior art is disclosed in, for example, US Application 2002/0092356 and JP Application 2002/195903. Disadvantages of the sensor of the touch-mode type are hysteretic behavior and poor tolerance for excessive pressure.

SUMMARY OF THE INVENTION

The object of the present invention is an improved capacitive sensor and an improved method of manufacturing a capacitive sensor. The present invention provides a sensor solution by means of which the linearity of measuring is improved.

The sensor solution according to the present invention is applicable for use particularly in small size capacitive pressure sensors, acceleration sensors, and sensors of angular velocity.

According to a first aspect of the present invention, a capacitive sensor is provided, comprising a movable electrode and a stationary electrode, such that the shape of the stationary electrode is stepped. Preferably the shape of the stationary electrode is essentially concave. Alternatively, the shape of the stationary electrode is essentially convex. Alternatively, the shape of the stationary electrode is essentially the shape of an inclined plane. Further, preferably, the shape of the stationary electrode is the shape of an inclined plane, which essentially coincides with the rotating plane at the extreme position.

Preferably the shape of the stationary electrode is implemented such, that the electrodes touch at several distinct points essentially over their entire surface when the movable electrode is at its extreme position. The shape of the stationary electrode is preferably optimized such, that a minimum of non-linearity error is achieved. Further, preferably, the shape of the stationary electrode is a lower order approximation of the equation for the ideal shape.

Preferably, the stationary electrode is prepared out of metal layer by layer. Further, preferably, the thicknesses of the layers of the stationary electrode are unequal. Preferably, the metal layers of the stationary electrode consist of mutually different metals or alloys.

Preferably, the shape of the stationary electrode in a plane is essentially quadrangular. Alternatively, the shape of the stationary electrode in a plane is essentially circular. Preferably, the stationary electrode is essentially cylindrically concave or convex. Alternatively, the stationary electrode is essentially spherically concave or convex. Preferably, there is a hole in the stationary electrode at the center of the metal layer.

Preferably, the structure of the stationary electrode is non-singly monolithic. Further, preferably, supporting structures are added to the stationary electrode. Further, preferably, the movable electrode is supported by a torsion spring. Alternatively, the movable electrode is supported by a bending spring.

Preferably, the sensor is a capacitive pressure sensor. Alternatively, the sensor is a capacitive acceleration sensor. Alternatively, the sensor is a capacitive sensor of angular velocity.

According to a second aspect of the present invention, a method is provided for the manufacturing of a capacitive sensor out of a silicon wafer element, in which method the stationary electrode of the capacitive sensor is manufactured in a stepped fashion using thin-film technology such, that a layer of metal is metallized onto a stationary surface of the capacitive sensor, the layer of metal is patterned by removing the layer of metal elsewhere than in the area of the desired pattern, and the metallization and patterning are repeated at least once such, that a stepped electrode structure is obtained.

Preferably, the stationary electrode is manufactured such, that an electrode structure of an essentially concave shape is achieved. Alternatively, the stationary electrode is manufactured such, that an electrode structure of an essentially convex shape is achieved. Alternatively, the stationary electrode is manufactured such, that an electrode structure of essentially the shape of an inclined plane is achieved. Further, preferably, the stationary electrode is manufactured such, that an electrode structure is achieved having essentially the shape of an inclined plane coinciding with the rotating plane at the extreme position.

Preferably, the patterning is implemented by etching. Alternatively, the patterning is implemented additively by means of a lift-off technique. Preferably, the thicknesses of the metal layers of the stationary electrode are unequal. Preferably, the metal layers of the stationary electrode consist of mutually different metals or alloys.

Preferably, the stationary electrode is prepared into such a shape that the electrodes touch at several distinct points essentially over their whole surface, when the movable electrode is at the extreme position. Preferably, the shape of the stationary electrode is optimized such, that a minimum of linearity error is achieved. Further, preferably, the shape of the stationary electrode is a lower order approximation of the equation for the ideal shape.

Preferably, the stationary electrode is manufactured to a shape essentially quadrangular in a plane. Alternatively, the stationary electrode is manufactured to a shape essentially circular in a plane. Preferably, the stationary electrode is manufactured to a shape essentially cylindrically concave or convex. Alternatively, the stationary electrode is manufactured to a shape essentially spherically concave or convex. Preferably, a hole is made in the stationary electrode at the center of the metal layer.

Preferably, the stationary electrode is manufactured into a structure that is non-singly monolithic. Further, preferably, support structures are added to the stationary electrode. Preferably, the movable electrode is supported by a torsion spring. Alternatively, the movable electrode is supported by a bending spring.

Preferably, a capacitive pressure sensor is manufactured out of the sensor. Alternatively, a capacitive acceleration sensor is manufactured out of the sensor. Alternatively, a capacitive sensor of angular velocity is manufactured out of the sensor.

BRIEF DESCRIPTION OF THE DRAWINGS

Below, the present invention and preferable ways of implementing the same are described in detail with exemplifying reference to the appended drawings, where.

DETAILED DESCRIPTION OF THE INVENTION

Below, a solution according to the present invention is described as applied in an exemplifying manner to a pressure sensor solution. The solution according to the invention can be similarly applied to be implemented in other capacitive sensor solutions as well, like, for example, in capacitive acceleration sensor solutions or capacitive sensor solutions of angular velocity.

The reduced force influencing the shape of the electrode of a capacitive sensor can be described by the equation $f=p/p_0$, where $p_0$ is the lowest pressure at which the electrodes touch one another. Thus, the coordinates of the movable electrode can be given as $z=f\,w(x, y)$. Here, the assumption is that the force causes a linear deformation. The coordinates of the stationary electrode are selected, which coordinates can be shown as $w(x,y)$. Thus, the capacitance of the sensor is given by the equation $$C = C_{00} + \int_A \frac{dxdy}{w(x, y) - fw(x, y)} =$$
$$C_{00} + \frac{1}{1-f}\int_A \frac{dxdy}{w(x, y)} = C_{00} + \frac{C_0}{1-f} = C_{00} + \frac{C_0}{1-p/p_0},$$

where $C_{00}$ is the stray capacitance, A is the area of the electrode and $C_0$ is the capacitance between the electrodes when $f=0$. By suitably selecting the stationary electrode, the same equation is obtained as the pressure sensor transfer function disclosed for a planar capacitor. Thus, a sensor capacitance of arbitrary shape will be made to electrically appear to be a planar capacitor.

Figure 1:
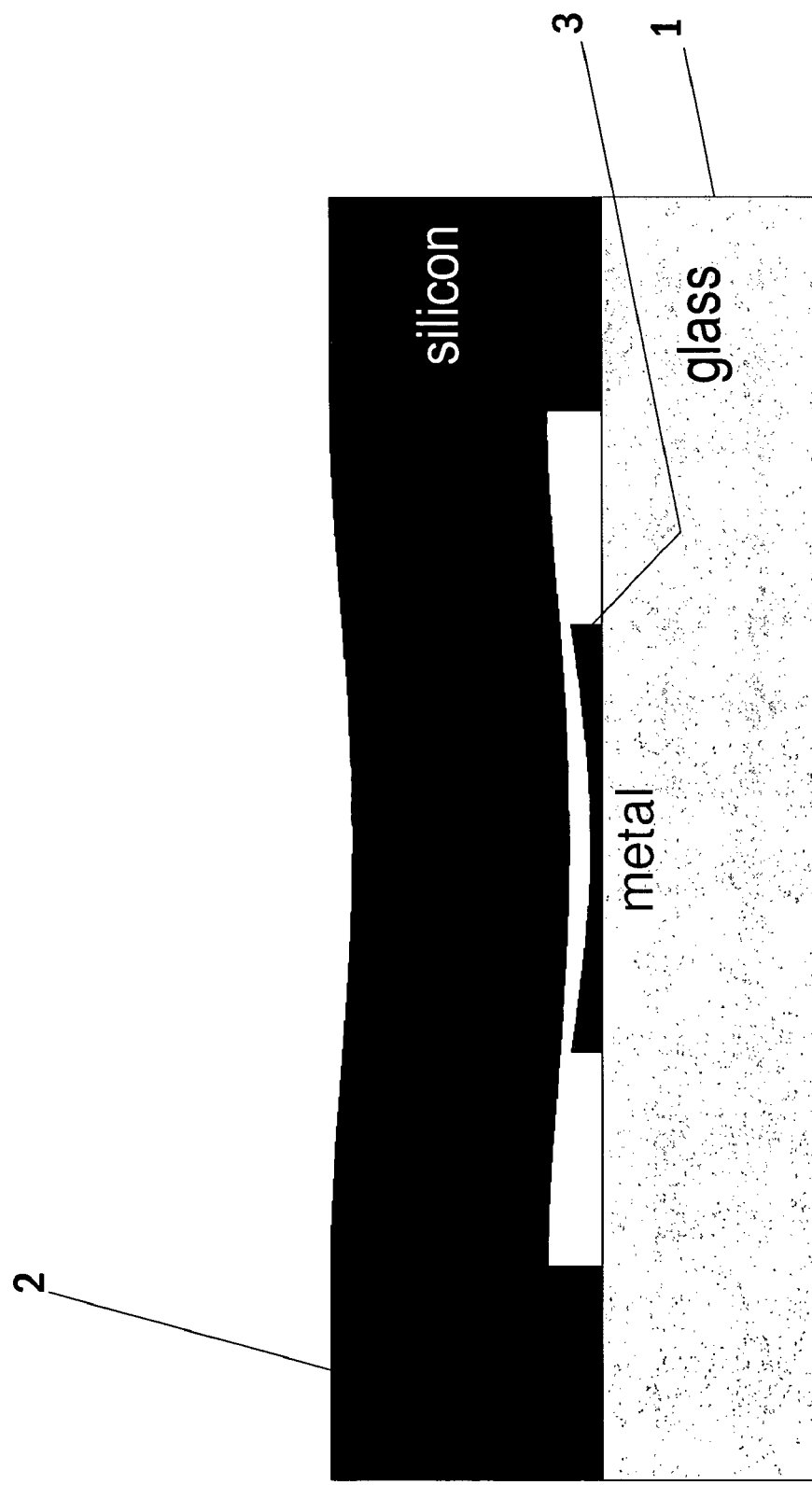
FIG. 1 shows a depiction in cross section of a pressure sensor according to the present invention, the sensor having an ideal stationary electrode.

FIG. 1 shows a depiction in cross section of a pressure sensor according to the present invention, the sensor having an ideal stationary electrode. The shape of the ideal stationary electrode according to the present invention was calculated in accordance with the equation above.

The ideal electrode according to the present invention is implemented into such a shape, that the electrodes touch at their entire surface area, when the deforming electrode is at its extreme position.

In FIG. 1, the glass surface of the micro-mechanical capacitive sensor according to the present invention is indicated by the numeral 1, the silicon structure constituting the movable electrode is indicated by the numeral 2, and the ideal stationary electrode is indicated by the numeral 3.

The shape of the stationary electrode implemented according to the present invention is, thus, essentially concave. The linearity characteristics of the sensor according to the present invention are considerably superior to prior art solutions. In the case of a pressure sensor, the concave stationary electrode according to the present invention also improves the ability of the sensor to withstand excessive pressures.

Figure 2:
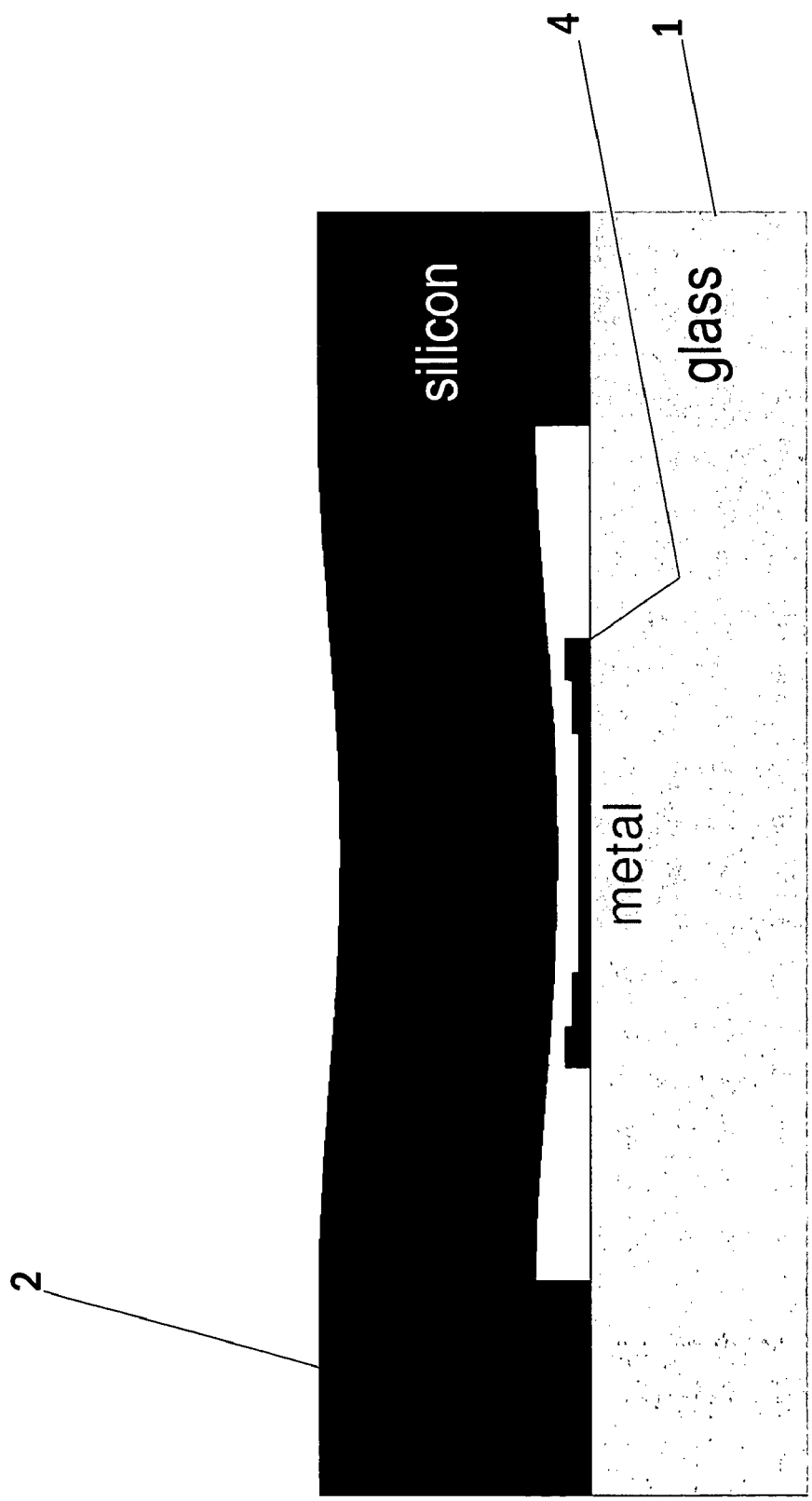
FIG. 2 shows a depiction in cross section of a pressure sensor according to the present invention, the sensor having a stepped stationary electrode.

FIG. 2 shows a depiction in cross section of a pressure sensor according to the present invention, the sensor having a stepped stationary electrode. The shape of the stationary electrode according to the present invention implemented in a stepped fashion is essentially concave.

The shape of the stationary electrode implemented in a stepped fashion according to the present invention is implemented such, that the electrodes touch at several distinct spots essentially over their entire surface area when the movable electrode is at the extreme position.

In FIG. 2 the glass surface of the micro-mechanical capacitive sensor according to the present invention is indicated by the numeral 1, the silicon structure constituting the movable electrode is indicated by the numeral 2, and the stationary electrode implemented in a stepped fashion is indicated by the numeral 4.

The linearity characteristics of the sensor implemented in a stepped fashion are also considerably superior to prior art solutions. In the case of a pressure sensor, the concave stationary electrode implemented in a stepped fashion according to the present invention also improves the sensor's ability to withstand excessive pressures.

The shape of the stepped stationary electrode according to the present invention can be optimized such, that a minimal linearity error is achieved. The shape of the electrode can, for example, be a lower order approximation of the equation for the ideal shape. The stepped stationary electrode according to the present invention can be manufactured, for example, out of metal, layer by layer.

Figure 3:
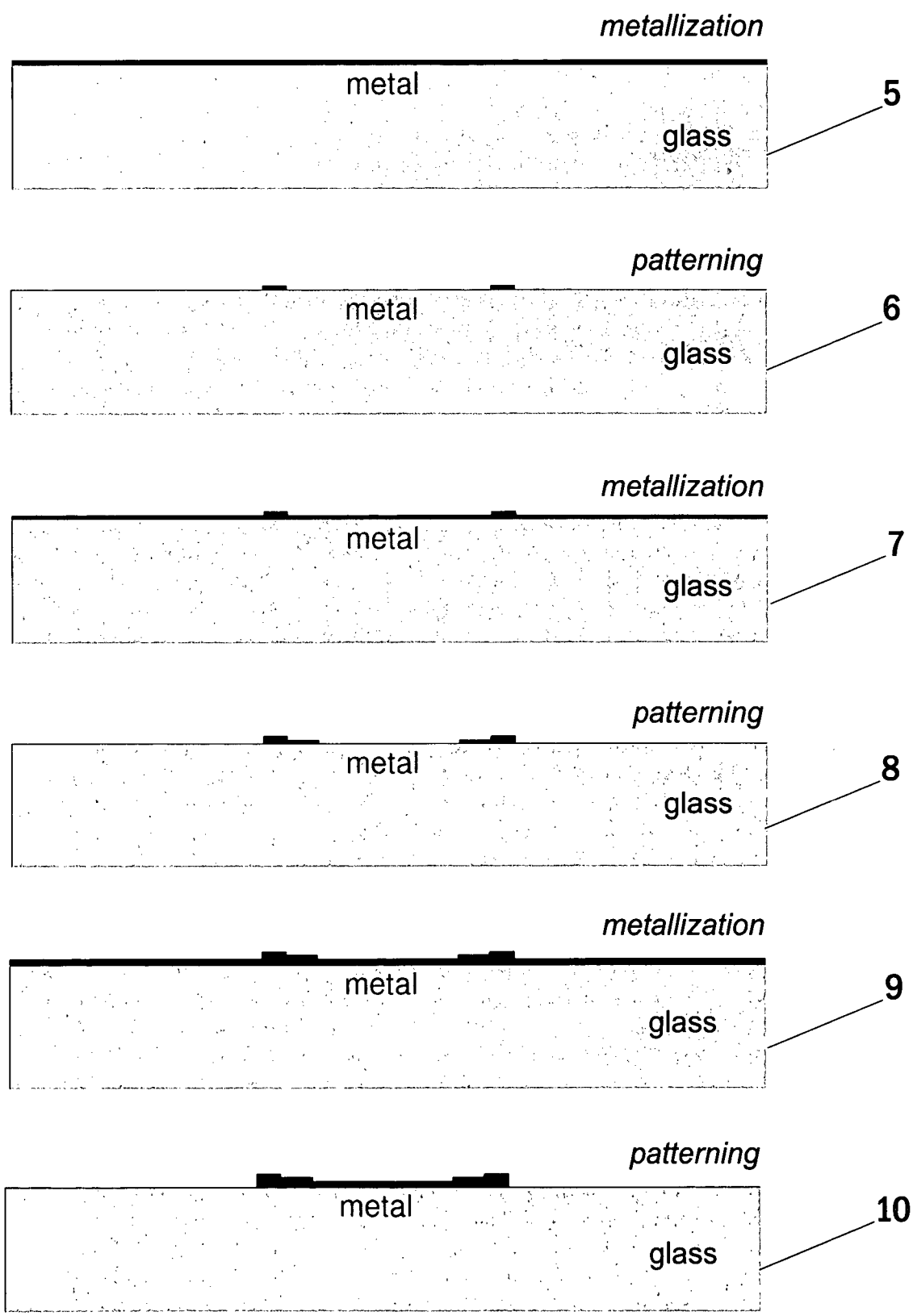
FIG. 3 shows a process chart of the manufacturing of a stepped stationary electrode of a capacitive sensor according to the present invention, including etching processes in the thin-film technique.

FIG. 3 shows a process chart of the manufacturing of a stepped stationary electrode of a capacitive sensor according to the present invention by using etching processes in a thin-film technique. Firstly, a metal layer is metallized 5 on the glass surface of a support structure of the micro-mechanical capacitive sensor according to the present invention, whereafter the metal layer is patterned 6. In the patterning 6 the metal layer is removed elsewhere than in the area of the desired pattern. The patterning 6 can be implemented, for example, by etching, or additively ("lift-off").

Then the metallization 7 is repeated, as is the patterning 8 following the metallization. The exemplifying process according to the figure comprises three rounds of metallization-patterning. Thus, after the patterning 8, a third metallization 9 and a third patterning 10 are performed.

The method according to the present invention of manufacturing a stepped stationary electrode of a capacitive sensor can be used for improving the linearity in several micro-mechanical sensor structures of different types, like, for example, capacitive pressure sensor solutions, capacitive acceleration sensor solutions, or solutions for a capacitive sensor of angular velocity.

The linearity of micro-mechanical sensors can be improved by manufacturing the stationary metal electrode in more than one round of metallization-patterning. The stepped electrode shape thus accomplished can, for example, be a lower order approximation of the ideal shape. The thicknesses of the metal layers can differ. The metal layers can also consist of mutually different metals or alloys.

The stationary shape of the metal electrode in a plane according to the present invention can be designed to an essentially quadrangular shape or an essentially circular shape. Further, the stationary shape of the metal electrode according to the present invention can be designed essentially cylindrically concave or convex or correspondingly essentially spherically concave or convex.

In the stationary electrode according to the present invention, there can also be a hole in the center of the metal layer. Further, in the sensor solution according to the present invention, the movable electrode can be made non-singly monolithic by, for example, adding supporting structures, like, for example, surrounding support structures.

Figure 4:
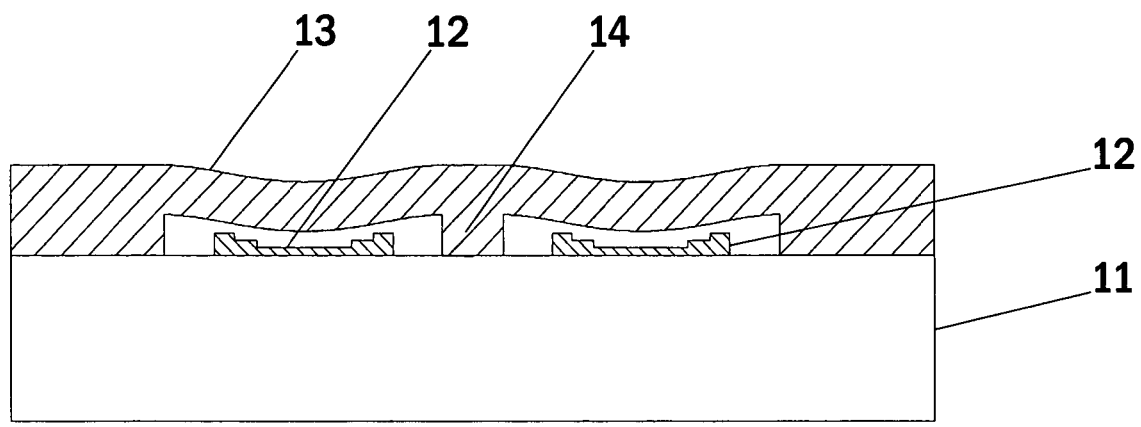
FIG. 4 shows a depiction in cross section of an alternative sensor solution according to the present invention.

FIG. 4 shows a depiction in cross section of an alternative sensor solution according to the present invention. The glass surface of the alternative micro-mechanical capacitive pressure sensor according to the present invention is indicated by the numeral 11, the stationary electrode implemented in a stepped fashion is indicated by the numeral 12, and the silicon structure constituting the movable electrode is indicated by the numeral 13.

In the alternative sensor solution according to the present invention, the movable electrode 12 is not singly monolithic. The movable electrode 12 comprises a support pillar 14, which attaches to the glass surface 11 of the sensor through a hole in the metal electrode.

Figure 5:
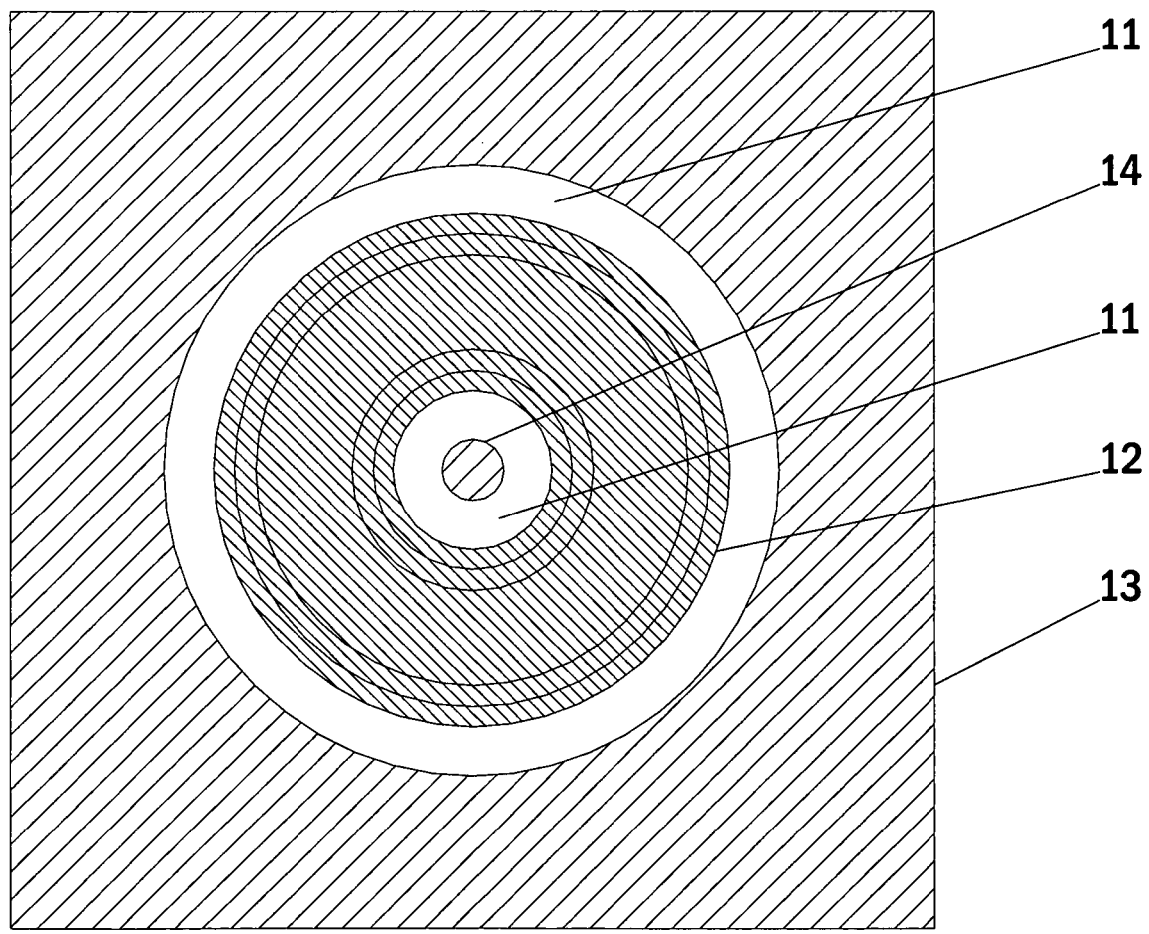
FIG. 5 shows a depiction in horizontal section of an alternative sensor solution according to the invention.

FIG. 5 shows a depiction in horizontal cross section of an alternative sensor solution according to the present invention. The glass surface of the alternative micro-mechanical capacitive sensor according to the present invention is indicated by the numeral 11, the stationary electrode implemented in a stepped fashion is indicated by the numeral 12, the silicon structure constituting the movable electrode is indicated by the numeral 13, and the support pillar of the movable electrode 13 is indicated by the numeral 14.

Below, the solution according to the present invention is described by way of example as applied to an acceleration sensor solution. The solution according to the present invention can similarly also be applied to be implemented in other capacitive sensor solutions, like, for, example, capacitive pressure sensor solutions or capacitive solutions for sensors of angular velocity.

Figure 6:
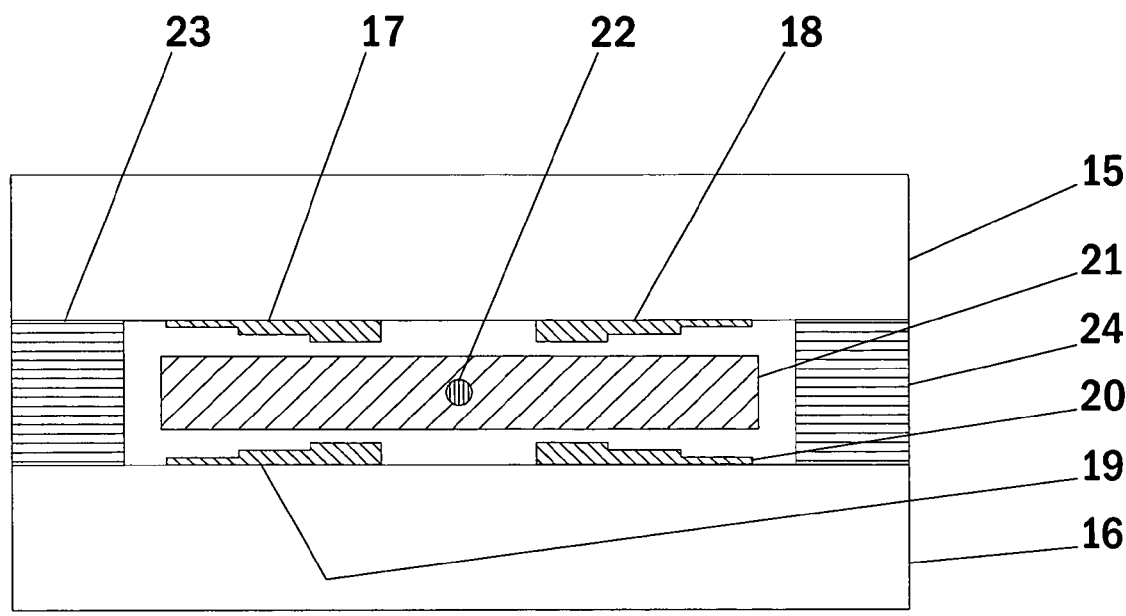
FIG. 6 shows a depiction in horizontal section of a second alternative sensor solution according to the invention.

FIG. 6 shows a depiction in cross section of a second alternative sensor solution according to the present invention. The glass surfaces of the second alternative micro-mechanical capacitive acceleration sensor according to the present invention are indicated by the numerals 15 and 16, four stationary electrodes implemented in a stepped fashion are indicated by the numerals 17-20, and the silicon structure constituting the movable electrode is indicated by the numeral 21.

In the second alternative sensor solution according to the present invention the seismic mass constituting the movable electrode 21 is pivoting around a torsion spring 22. The stepped stationary electrodes 17-20 are created on top of the glass surfaces 15 and 16 of the acceleration sensor. The glass surfaces 15 and 16 of the acceleration sensor are correspondingly attached to each other by means of supporting walls 23 and 24.

In the second alternative sensor solution according to the present invention, the shape of the stationary electrode 17-20 is either essentially convex or essentially of the shape of an inclined plane. Preferably, the shape of the stationary electrode 17-20 is the shape of an inclined plane essentially coinciding with the rotating plane at the extreme position.

Figure 7:
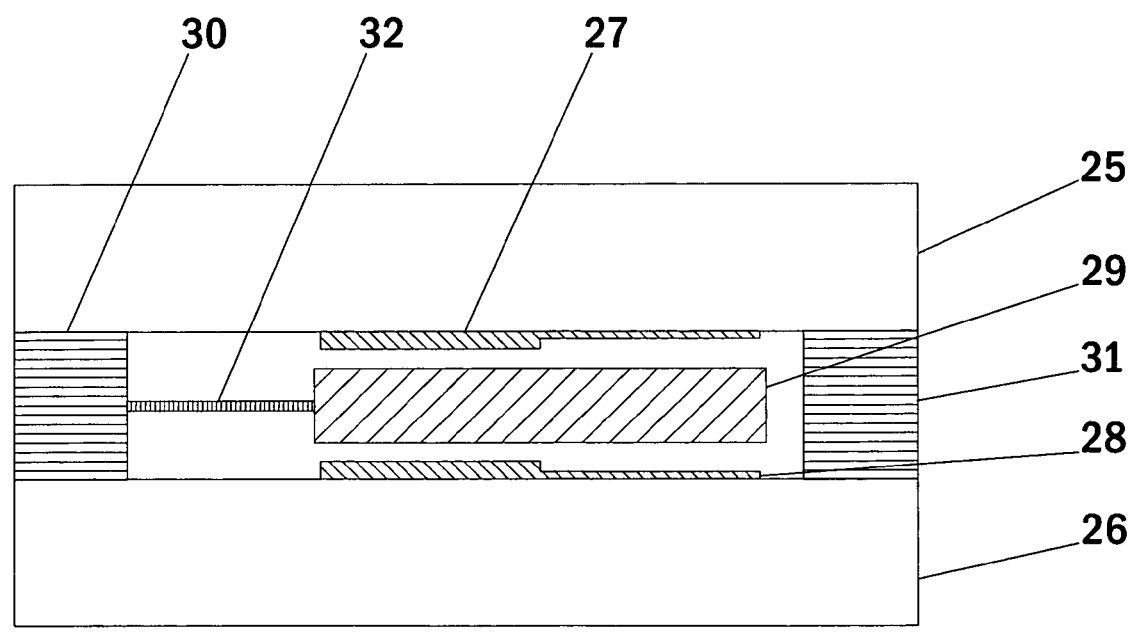
FIG. 7 shows a depiction in horizontal section of a third alternative sensor solution according to the invention.

FIG. 7 shows a depiction in cross section of a third alternative sensor solution according to the present invention. The glass surfaces of the third alternative micro-mechanical capacitive acceleration sensor according to the present invention are indicated by the numerals 25 and 26, two stationary electrodes implemented in a stepped fashion are indicated by the numerals 27 and 28, and the silicon structure constituting the movable electrode is indicated by the numeral 29. The glass surfaces 25 and 26 of the acceleration sensor are attached to each other by means of supporting walls 30 and 31.

In the third alternative sensor solution according to the present invention, the seismic mass constituting the movable electrode 29 is attached to the supporting wall 30 by a bending spring 32. The shape of the stationary electrode 27-28 is either essentially convex or essentially the shape of an inclined plane. Preferably, the shape of the stationary electrode 27-28 is the shape of an inclined plane essentially coinciding with the rotating plane at the extreme position.

The linearity of the capacitive sensors according to the present invention can be improved by designing the stationary metal electrode such, that the electrodes touch over their entire surface when the deforming electrode is at its extreme position. Implemented in this manner, the capacitor electrically appears to be a planar capacitor.

In the micro-mechanical capacitive sensors according to the present invention, the ideal shape of the stationary electrode can be imitated by compiling the metal electrode out of more than one thin-film. The shape of the stationary metal electrode implemented in a stepped fashion can be optimized such, that a minimum of linearity error is achieved.

By means of the present invention, a method of improved linearity is provided for manufacturing a capacitive sensor, and a capacitive sensor, which is applicable, in particular, for use in capacitive sensor solutions of a small size. The sensor solution according to the present invention can be applied, in particular, to capacitive pressure sensors, capacitive acceleration sensors, and capacitive sensors of angular velocity, of a small size.

The invention claimed is:

1. A capacitive sensor comprising:
a movable electrode; and
a stationary electrode; and
a stationary surface of the capacitive sensor,
wherein the shape of the stationary electrode is stepped,
wherein the stationary electrode is manufactured onto the stationary surface of the capacitive sensor using thin-film technology,
wherein the shape of the stationary surface of the capacitive sensor is essentially planar, and
wherein the capacitive sensor is configured to measure capacitance.

2. The sensor according to claim 1, wherein the shape of the stationary electrode is essentially concave.

3. The sensor according to claim 1, wherein the shape of the stationary electrode is essentially convex.

4. The sensor according to claim 1, wherein the shape of the stationary electrode is essentially the shape of an inclined plane.

5. The sensor according to claim 4, wherein the shape of the stationary electrode is the shape of an inclined plane, which essentially coincides with a rotating plane at an extreme position.

6. The sensor according to claim 1, wherein the shape of the stationary electrode is implemented such, that the electrodes touch at several distinct spots essentially over their entire surface when the movable electrode is at the extreme position.

7. The sensor according to claim 1, wherein the shape of the stationary electrode is optimized such, that a minimum of linearity error is achieved.

8. The sensor according to claim 7, wherein the shape of the stationary electrode is a lower order approximation of the equation for the ideal shape.

9. The sensor according to claim 1, wherein the stationary electrode is manufactured layer by layer out of metal.

10. The sensor according to claim 9, wherein the thicknesses of the metal layers of the stationary electrode are unequal.

11. The sensor according to claim 9 wherein the metal layers of the stationary electrode consist of mutually different metals or alloys.

12. The sensor according to claim 1, wherein the shape of the stationary electrode is essentially circular in a plane.

13. The sensor according to claim 1, wherein the shape of the stationary electrode is essentially quadrangular in a plane.

14. The sensor according to claim 12, wherein the stationary electrode is essentially cylindrically concave or convex.

15. The sensor according to claim 12 wherein the stationary electrode is essentially spherically concave or convex.

16. The sensor according to claim 12 wherein there is a hole in the center of the metal layer of the stationary electrode.

17. The sensor according to claim 1, wherein the structure of the stationary electrode is non-singly monolithic.

18. The sensor according to claim 17, wherein support structures have been added to the stationary electrode.

19. The sensor according to claim 1, wherein the movable electrode is supported by a torsion spring.

20. The sensor according to claim 1, wherein the movable electrode is supported by a bending spring.

21. The sensor according to claim 1, wherein the sensor is a capacitive pressure sensor.

22. The sensor according to claim 1, wherein the sensor is a capacitive acceleration sensor.

23. The sensor according to claim 1, wherein the sensor is a capacitive sensor of angular velocity.

24. A method for manufacturing a stationary electrode of a capacitive sensor, the method comprising:

metallizing a metal layer onto a stationary surface of the capacitive sensor;

patterning the metal layer by removing the metal layer elsewhere than in the area of the desired pattern; and repeating the metallizing and the patterning at least once such that a stepped electrode structure is obtained, wherein the stationary electrode of the capacitive sensor is manufactured onto the stationary surface of the capacitive sensor in a stepped fashion using thin-film technology, wherein the stationary surface of the capacitive sensor is essentially planar, and wherein the capacitive sensor is configured to measure capacitance.

25. The method according to claim 24, wherein the stationary electrode is manufactured such that an electrode structure of essentially concave shape is obtained.

26. The method according to claim 24, wherein the stationary electrode is manufactured such that an electrode structure of essentially convex shape is obtained.

27. The method according to claim 24, wherein the stationary electrode is manufactured such that an electrode structure of essentially the shape of an inclined plane is obtained.

28. The method according to claim 27, wherein the stationary electrode is manufactured such that an electrode structure shape is obtained being the shape of an inclined plane, which essentially coincides with a rotating plane at an extreme position.

29. The method according to claim 24, wherein the patterning is implemented by etching.

30. The method according to claim 24, wherein the patterning is implemented additively by means of a lift-off technique.

31. The method according to claim 24, wherein the thicknesses of the metal layers of the stationary electrode are unequal.

32. The method according to claim 24, wherein the metal layers of the stationary electrode consist of mutually different metals or alloys.

33. The method according to claim 24, wherein the stationary electrode is manufactured to such a shape, that the stationary electrode and a movable electrode touch at several distinct spots essentially over their entire surface when the movable electrode of the capacitive sensor is at the extreme position.

34. The method according to claim 24, wherein the shape of the stationary electrode is optimized such, that a minimum of linearity error is achieved.

35. The method according to claim 34, wherein shape of the stationary electrode is a lower order approximation of the ideal shape.

36. The method according to claim 24, wherein the stationary electrode is manufactured essentially in the shape of a circle in a plane.

37. The method according to claim 24, wherein the stationary electrode is manufactured essentially in the shape of a quadrangle in a plane.

38. The method according to claim 37, wherein the stationary electrode is manufactured essentially to a cylindrically concave or convex shape.

39. The method according to claim 37 wherein the stationary electrode is manufactured essentially to a spherically concave or convex shape.

40. The method according to claim 38 wherein a hole is made in the stationary electrode at the center of the metal layer.

41. The method according to claim 24, wherein the stationary electrode is manufactured such that its structure is non-singly monolithic.

42. The method according to claim 41, wherein support structures are added to the stationary electrode.

43. The method according to claim 24, wherein a movable electrode of the capacitive sensor is supported by a torsion spring.

44. The method according to claim 24, wherein a movable electrode of the capacitive sensor is supported by a bending spring.

45. The method according to claim 24, wherein the capacitive sensor is made into a capacitive pressure sensor.

46. The method according to claim 24, wherein the capacitive sensor is made into a capacitive acceleration sensor.

47. The method according to claim 24, wherein the capacitive sensor is made into a capacitive sensor of angular velocity.

* * * * *